US006563082B2

(12) United States Patent
Terada et al.

(10) Patent No.: US 6,563,082 B2
(45) Date of Patent: May 13, 2003

(54) LASER CUTTING METHOD, LASER CUTTING APPARATUS, AND METHOD AND APPARATUS FOR MANUFACTURING LIQUID CRYSTAL DEVICE (75) Inventors: Shoichi Terada, Kumamoto (JP); Kazuto Yoshimura, Suwa (JP); Kenji Masuda, Hata-machi (JP); Hidehiro Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/951,439

(22) Filed: Sep. 14, 2001

(65) Prior Publication Data
US 2002/0060210 A1 May 23, 2002

(30) Foreign Application Priority Data

Sep. 20, 2000 (JP) ......................... 2000-284896
Sep. 3, 2001 (JP) ......................... 2001-265218

(51) Int. Cl.$^7$ ..................... B23K 26/00; B23K 26/02
(52) U.S. Cl. ..................... 219/121.72; 219/121.76; 219/121.77; 219/121.82
(58) Field of Search .................... 219/121.67, 121.72, 219/121.76, 121.77, 121.82

(56) References Cited

U.S. PATENT DOCUMENTS

| | | | |
|---|---|---|---|
| 5,093,549 A | * 3/1992 | Iwai et al. | 219/121.67 |
| 5,138,131 A | * 8/1992 | Nishikawa et al. | 219/121.67 |
| 5,521,352 A | * 5/1996 | Lawson | 219/121.67 |
| 5,578,229 A | * 11/1996 | Barnekov et al. | 219/121.67 |
| 6,087,625 A | * 7/2000 | Iso | 219/121.6 |
| 6,407,360 B1 | * 6/2002 | Choo et al. | 219/121.67 |

FOREIGN PATENT DOCUMENTS

| | | | |
|---|---|---|---|
| JP | 363240526 A | * | 10/1988 |
| JP | 10-244386 | | 9/1998 |

* cited by examiner

Primary Examiner—M. Alexandra Elve
Assistant Examiner—Kevin McHenry
(74) Attorney, Agent, or Firm—Oliff & Berridge, PLC.

(57) ABSTRACT

Scribe lines are formed in advance at cutting locations on both surfaces of a panel formed by bonding an upper substrate and a lower substrate to each other via a sealing material, and a laser beam is applied to each of the scribe lines on both surfaces, by which a liquid crystal panel having a product size is obtained.

18 Claims, 10 Drawing Sheets

PDA (b)

PORTABLE TELEPHONE (c)

DIGITAL CAMERA

LASER CUTTING METHOD, LASER CUTTING APPARATUS, AND METHOD AND APPARATUS FOR MANUFACTURING LIQUID CRYSTAL DEVICE

BACKGROUND OF THE INVENTION

1. Field of the Invention

The present invention relates to a laser cutting method and a laser cutting apparatus for cutting two substrates disposed one over the other and bonded to each other, such as a liquid crystal panel, and a method and an apparatus for manufacturing a liquid crystal device.

2. Description of the Related Art

In a manufacturing process for a liquid crystal panel, a large number of products are taken out of one glass substrate. In this case, the glass substrate must be cut and separated to fit a liquid crystal panel to a product size.

Figure 14:
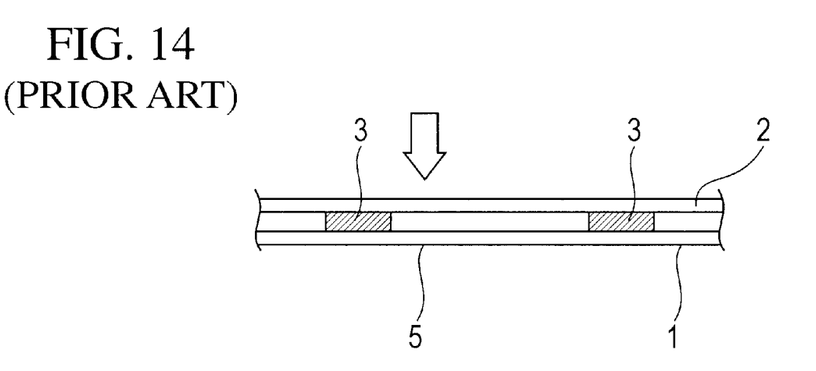
FIG. 14 is an explanatory view of a conventional method for cutting substrates.

FIG. 14 is an explanatory view for illustrating a conventional cutting method for fitting a liquid crystal panel to a product size. On the surface of one glass substrate 1 of two glass substrates 1 and 2, which are bonded to each other via a sealing material 3 for sealing liquid crystal, a scribe line 5 is formed with, for example, a diamond tip. After the two glass substrates 1 and 2 are turned over, a bending stress is applied from the surface of the other glass substrate 2 by using a jig such as a rubber roller so as to cut two glass substrates 1 and 2.

Figure 15:
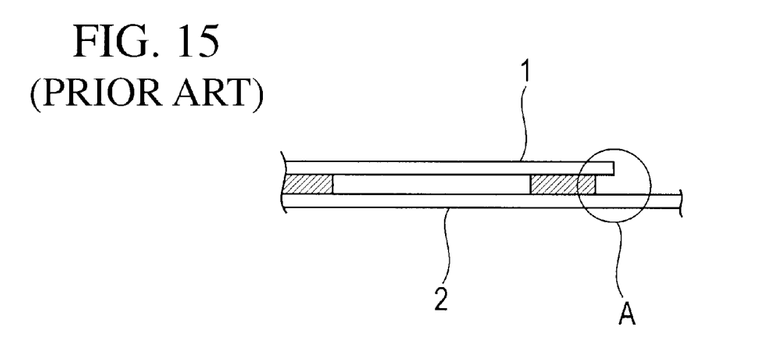
FIG. 15 is an explanatory view for illustrating a problem with a conventional method for cutting substrates.

However, in the conventional cutting method as described above, the start point of a crack on the scribe line appears unstably, and the glass substrates are cut discontinuously, so that many chippings are produced. If many chippings are produced, cleaning must be performed to remove the chippings. Also, because this method is of a contact cutting mode, any foreign matter sticking on the rubber roller may scratch the glass substrate 2. Also, because the destructive power by the rubber roller is low, the glass substrates including the sealing material 3 cannot be cut, so that cutting must be performed at an area without the sealing material 3. Therefore, as shown in portion A of FIG. 15, a cleaning solution (liquid for cleaning liquid crystal which wets the glass substrates when it is enclosed) remains undesirably between the glass substrate 1 and the glass substrate 2 in the vicinity of the sealing material 3. Since the cleaning solution reacts with wiring of the liquid crystal panel, it is necessary to remove the cleaning solution.

Also, a method in which a laser beam is employed to cut a glass substrate etc. has been proposed (for example, Japanese Patent Laid-Open No. 11-104869 specification). However, this cutting method has been premised to cut one substrate, not to cut two substrates. Even if an attempt is made to cut two substrates by this method, they cannot be cut under the same conditions. Although they can be cut by increasing laser power (or decreasing cutting speed), such a method has problems of low cutting accuracy (linearity) and no reproducibility. These problems will be explained in further detail.

In the case of cutting one substrate with a laser beam, an internal stress due to heat is utilized. In the case of cutting two substrates, the following problems arise:

(1) A thermal stress acts in the upper glass substrate only. This is because glass has a high light absorption coefficient, so that only the upper glass substrate is heated, and the lower glass substrate is not heated.

(2) The upper and lower glass substrates are connected to each other by the sealing material (see FIG. 14), and so that when the upper glass substrate is going to crack, the lower glass substrate serves to restrain the cracking of the upper glass substrate. Accordingly, two substrates cannot be cut under the same conditions of cutting one glass substrate.

(3) Although force to cut the upper glass substrate can be increased by increasing thermal energy, the lower glass substrate is cut by receiving the force via the sealing material. However, the received force depends on the construction of panel, the bonding state of sealing material, etc. and has no reproducibility.

SUMMARY OF THE INVENTION

The present invention has been achieved to solve the above problems, and accordingly an object thereof is to provide a laser cutting method and a laser cutting apparatus, and a method and an apparatus for manufacturing a liquid crystal device, in which a plurality of substrates disposed one over another, especially two substrates disposed one over the other and bonded to each other, can be cut with higher accuracy.

(1) One mode of the present invention provides a laser cutting method in which a laser beam is applied to a pair of opposed substrates to cut the paired substrates, including at least the steps of applying a first laser beam from a first surface side of one substrate of the paired substrates; and applying a second laser beam from a second surface side of the other substrate of the paired substrates. In the present invention, laser beams are applied to both surfaces of the paired substrates. When a laser beam is applied, the temperature of the irradiated location rises, so that a thermal stress developed by the temperature gradient increases. Therefore, a crack is generated on each of the substrates in the thickness direction, so that a high cutting accuracy (linearity) and excellent reproducibility is provided. Also, since the substrates are cut in a non-contact mode, there is no fear of scratching the substrates like the prior art. In this case, if the step of applying the first laser beam and the step of applying the second laser beam are carried out at the same time, the working time can be shortened.

(2) In the laser cutting method in accordance with another mode of the present invention, scribe lines are formed in advance at cutting locations on the substrates, and the laser beams are applied to the scribelines. In the present invention, when the laser beams are applied to the scribe lines, the temperature of the irradiated location rises, so that a thermal stress developed by the temperature gradient increases. Therefore, cracks originating at the scribe lines develop in the thickness direction to break the substrates, so that the cutting accuracy (linearity) is further enhanced.

(3) In the laser cutting method in accordance with still another mode of the present invention, the pair of substrates and the laser beams are moved relatively to cut the pair of substrates. To do this, there can be used a method in which a position of the pair of substrates is fixed and the laser beams are moved along the scribe lines, or a method in which locations irradiated with the laser beams are fixed and a work support section supporting the pair of substrates is moved. In the present invention, cracks originating at the scribe lines develop in the thickness direction, and the cracks propagate along with the relative movement of the laser beams, by which the pair of substrates is cut along the scribe lines.

(4) In the laser cutting method in accordance with still another mode of the present invention, further in the laser cutting method of the above item (3), correlation between a relative moving speed of the laser beams to the pair of opposed substrates and a power density of the laser beams is set in a predetermined range. If the relative speed of the laser beams is low and the power density of the laser beams is high, the substrate is destroyed. If the relative speed of the laser beams is high and the power density of the laser beams is low, the substrate cannot be cut. In the present invention, therefore, the relative speed of the laser beams and the power density of the laser beams are set so that the correlation therebetween is in a predetermined range in order for the substrate to be cut properly.

(5) In the laser cutting method in accordance with still another mode of the present invention, further in the laser cutting method of any one of the above items (1) to (4), upper and lower substrates are cut including another member, for example, a sealing material, interposed between the pair of opposed substrates. In the present invention, since a laser beam is applied to each of both surfaces of the two substrates, the substrates having another member (including the later-described sealing material and bonding layer) interposed therebetween can be cut.

(6) In the laser cutting method of any one of the above items (1) to (5), objects to cut include a substrate consisting of a glass-based or crystal-based member.

(7) In the laser cutting method in accordance with still another mode of the present invention, further in the laser cutting method of any one of the above items (1) to (6), a laser having a high energy absorption coefficient with respect to a substrate to cut, for example, a $CO_2$ laser or a YAG laser, is used to cut the substrate. By using such a laser corresponding to the substrate, the cutting operation can be performed efficiently.

(8) One mode of the present invention provides a laser cutting apparatus in which a laser beam is applied to a pair of opposed substrates to cut the paired substrates, comprising at least a laser oscillator for emitting a laser beam; and an irradiation mechanism for applying the laser beam to a cutting location of the paired substrates.

(9) In the laser cutting apparatus in accordance with another mode of the present invention, the laser beam is branched into a plurality of beams, and the branched beams are applied to a plurality of locations on the paired substrates, by which the plurality of locations on the substrates can be cut at the same time. According to the present invention, the plurality of locations (a plurality of lines) on the substrates can be cut at the same time.

(10) In the laser cutting apparatus in accordance with still another mode of the present invention, the laser cutting apparatus further comprises a first irradiation mechanism for applying a first laser beam from the first surface side of one substrate of the paired substrates; and a second irradiation mechanism for applying a second laser beam from the second surface side of the other substrate of the paired substrates. Also, the laser cutting apparatus further comprises a beam condensing device for condensing and applying the first and second laser beams to the cutting locations on the substrates.

(11) In the laser cutting apparatus in accordance with still another mode of the present invention, the laser cutting apparatus further comprises laser branching means for branching each of the first and second laser beams into a plurality of beams, and a beam condensing device for condensing and applying the branched beams to the cutting locations on the substrates. According to the apparatus of the present invention, a plurality of locations (a plurality of lines) on the substrates can be cut at the same time.

(12) In the laser cutting apparatus in accordance with still another mode of the present invention, the laser cutting apparatus further comprises a mechanism for relatively moving the substrates and the laser beams along scribe lines formed at the cutting locations of the substrates. This mechanism may consist of a substrate movement mechanism comprising a work support section for supporting the paired substrates, an X slide mechanism for moving the work support section in the X direction, and a Y slide mechanism for moving the work support section in the Y direction. Also, this mechanism may consist of a scanning device for moving the laser beams.

(13) In the laser cutting apparatus in accordance with still another mode of the present invention, the relative movement of the laser beam with respect to the substrates is controlled based on the relationship between the relative speed of the laser beams with respect to the substrates and the power density of the laser beams.

(14) In the laser cutting apparatus in accordance with still another mode of the present invention, the laser cutting apparatus further comprises a $CO_2$ laser used for glass-based or crystal-based substrates and/or a YAG laser used for silicon-based substrates.

(15) One mode of the present invention provides a method for manufacturing a liquid crystal device, comprising the steps of bonding a pair of opposed substrates to each other; and applying a first laser beam from the first surface side of one substrate of the paired substrates and applying a second laser beam from the second surface side of the other substrate of the paired substrates.

(16) In the method for manufacturing a liquid crystal device in accordance with another mode of the present invention, the liquid crystal device is made by bonding a pair of opposed substrates to each other via a sealing material, and the pair of substrates including the sealing material is cut. Thereby, a state in which cleaning solution remains in the vicinity of a sealing portion can be avoided.

(17) In the method for manufacturing a liquid crystal device in accordance with still another mode of the present invention, each of the first and second laser beams is branched into a plurality of beams, and the branched beams are applied to a plurality of locations on each surface of the substrates to cut the substrates at the plurality of locations at the same time. According to the present invention, the plurality of locations (a plurality of lines) on the substrates of the liquid crystal device can be cut at the same time.

(18) In the method for manufacturing a liquid crystal device in accordance with still another mode of the present invention, after liquid crystal is injected between the pair of substrates, the paired substrates are cut.

(19) In the method for manufacturing a liquid crystal device in accordance with still another mode of the present invention, after the paired substrates are cut by the laser beams, liquid crystal is injected.

(20) One mode of the present invention provides an apparatus for manufacturing a liquid crystal device, by which a liquid crystal device constructed by holding liquid crystal between a pair of opposed substrates is manufactured, comprising at least a laser oscillator; and an irradiation mechanism for applying a laser beam emitted from the laser oscillator to the paired substrates.

(21) In the apparatus for manufacturing a liquid crystal device in accordance with another mode of the present invention, the apparatus further comprises a first irradiation mechanism for applying a first laser beam from the first surface side of one substrate of the paired substrates; and a second irradiation mechanism for applying a second laser beam from the second surface side of the other substrate of the paired substrates.

(22) In the apparatus for manufacturing a liquid crystal device in accordance with still another mode of the present invention, the apparatus further comprises a work support section for supporting the paired substrates, and the work support section has an opening penetrating the work support section. A plurality of the openings having a slender shape may be formed in the work support section.

(23) In the apparatus for manufacturing a liquid crystal device in accordance with still another mode of the present invention, the irradiation mechanism includes a moving device for moving the paired substrates and/or a scanning device for moving the laser beams.

(24) In the apparatus for manufacturing a liquid crystal device in accordance with still another mode of the present invention, the apparatus further comprises laser branching means for branching each of the first and second laser beams into a plurality of beams.

DETAILED DESCRIPTION OF THE PREFERRED EMBODIMENTS

First Embodiment

Figure 1:
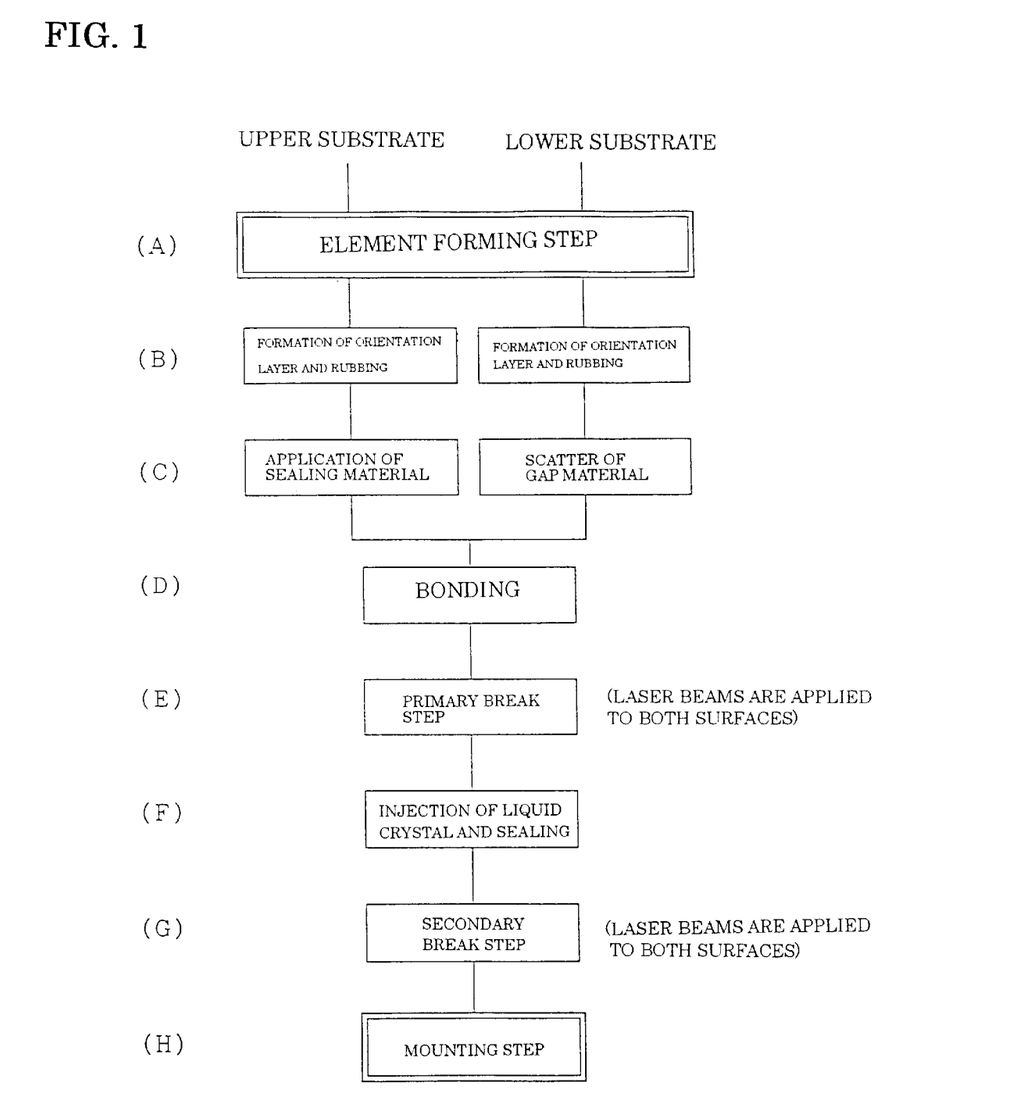
FIG. 1 is a flowchart showing a manufacturing process of a liquid crystal panel to which a laser cutting method in accordance with a first embodiment of the present invention is applied.
Figure 2:
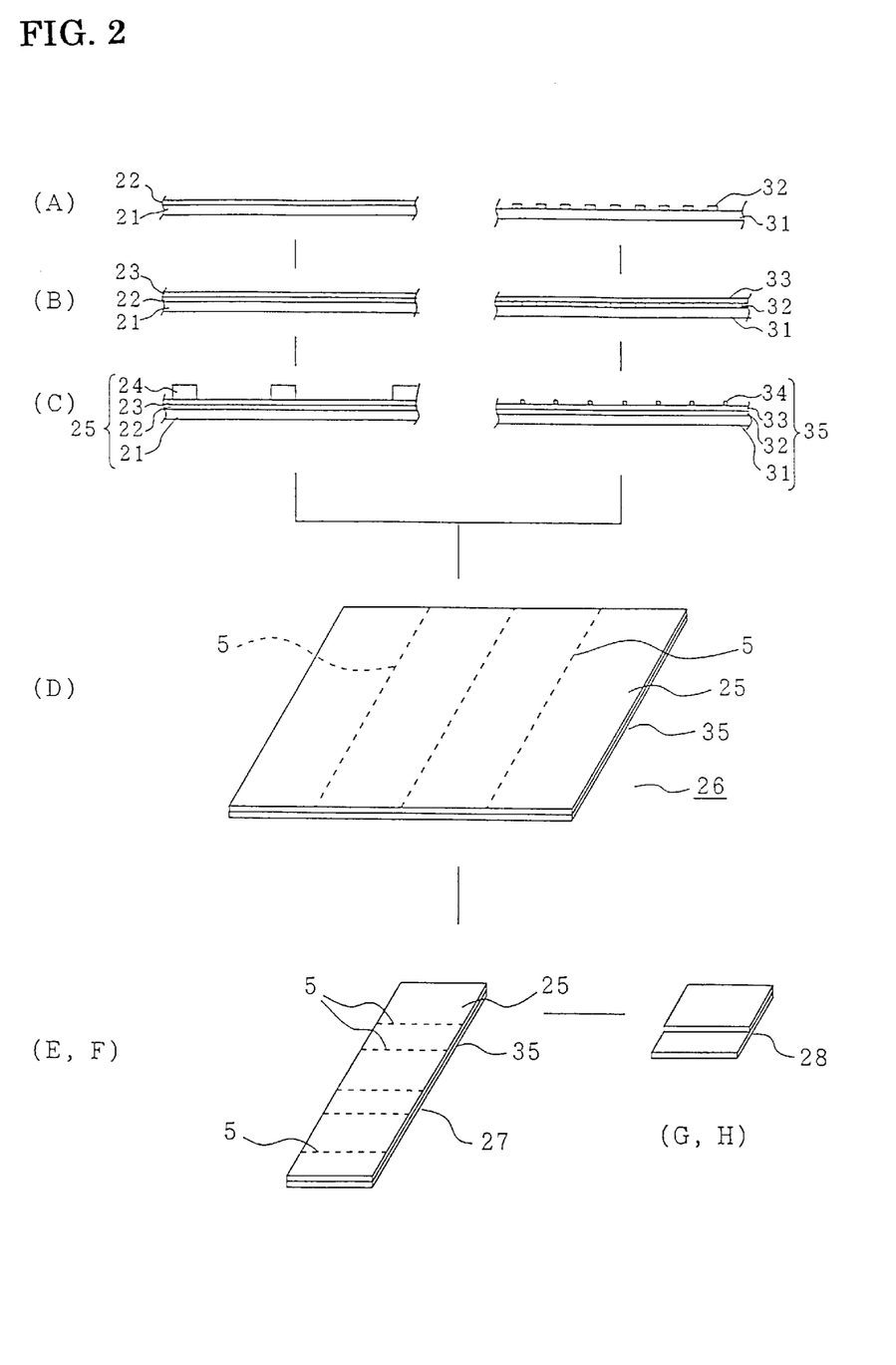
FIG. 2 is an explanatory view showing states of substrates corresponding to the processing shown in FIG. 1.
Figure 3:
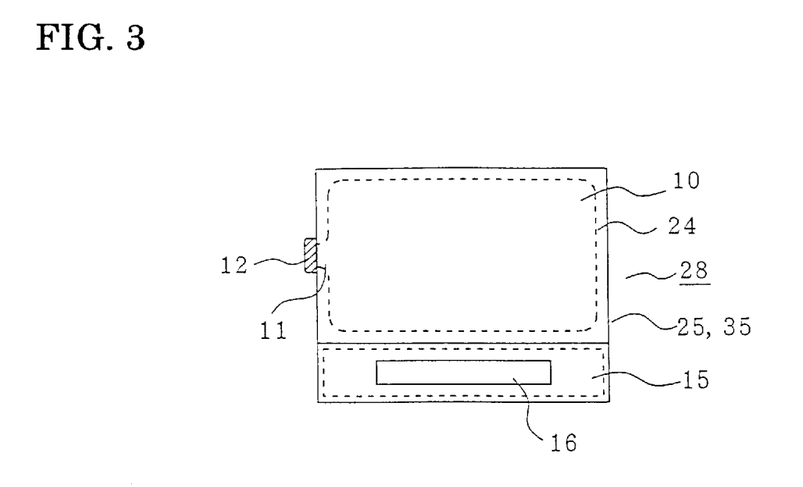
FIG. 3 is a plan view of a liquid crystal panel manufactured through the manufacturing process shown in FIG. 1.

FIG. 1 is a flowchart showing a manufacturing process of a liquid crystal panel to which a laser cutting method in accordance with a first embodiment of the present invention is applied, FIG. 2 is an explanatory view showing states of manufacture of substrates corresponding to the processing shown in FIG. 1, and FIG. 3 is a plan view of the manufactured liquid crystal panel.

First, the configuration of the liquid crystal panel shown in FIG. 3 will be explained. A liquid crystal panel 28 is formed by bonding two substrates (upper substrate 25 and lower substrate 35), and is made up of a liquid crystal display section 10 and a mounting section 15. The liquid crystal display section 10 is surrounded by the substrates 25 and 35 and a sealing material 24, and liquid crystal is injected into this surrounded space through a liquid crystal injection port 11. The liquid crystal injection port 11 is sealed by a liquid crystal sealing material 12. Also, the mounting section 15 is formed with terminals (not shown), and the terminals are connected to electrodes for driving the liquid crystal. The terminal is mounted with IC 16 and wiring, not shown.

Next, the manufacturing process for a liquid crystal will be explained with reference to FIGS. 1 and 2.

(A) First, in an element forming step, elements are formed on an upper substrate 21 and a lower substrate 31 as shown in FIG. 2. For example, as shown in FIG. 2, a common electrode 22 is formed on the upper substrate 21, and a thin-film transistor 32 is formed on the lower substrate 31. The elements formed in this element forming step differ according to the type of crystal panel.

(B) Next, an orientation layer 23 is formed on the upper substrate 21 with the common electrode 22, and rubbing is performed. Likewise, an orientation layer 33 is formed on the lower substrate 31 with the thin-film transistor 32, and rubbing is performed.

(C) A sealing material 24 is applied onto one substrate, for example, the upper substrate 21 to seal the liquid crystal. Also, a gap material 34 is scattered onto the orientation layer 33 of the other substrate, for example, the lower substrate 31. The application of sealing material and the scatter of gap material are not limited to the above-described mode, and the sealing material may be applied and the gap material can be scattered onto one substrate.

(D) Two substrates 25 and 35 prepared in steps (A) to (C) are bonded to manufacture one large panel 26.

(E) Next, as a primary break step, the panel 26 is cut to manufacture strip-shaped panels 27. In this cutting operation, scribe lines 5 are formed at cutting locations on both surfaces of the panel 26, and laser beams are applied to the scribe lines 5 on both surfaces of the panel 26 to perform cutting. In this case, a plurality of scribe lines 5 may be cut at the same time.

(F) Liquid crystal is injected through the liquid crystal injection port 11 in the strip-shaped panel 27, and the liquid crystal is sealed by the liquid crystal sealing material 12 shown in FIG. 3.

Figure 4:
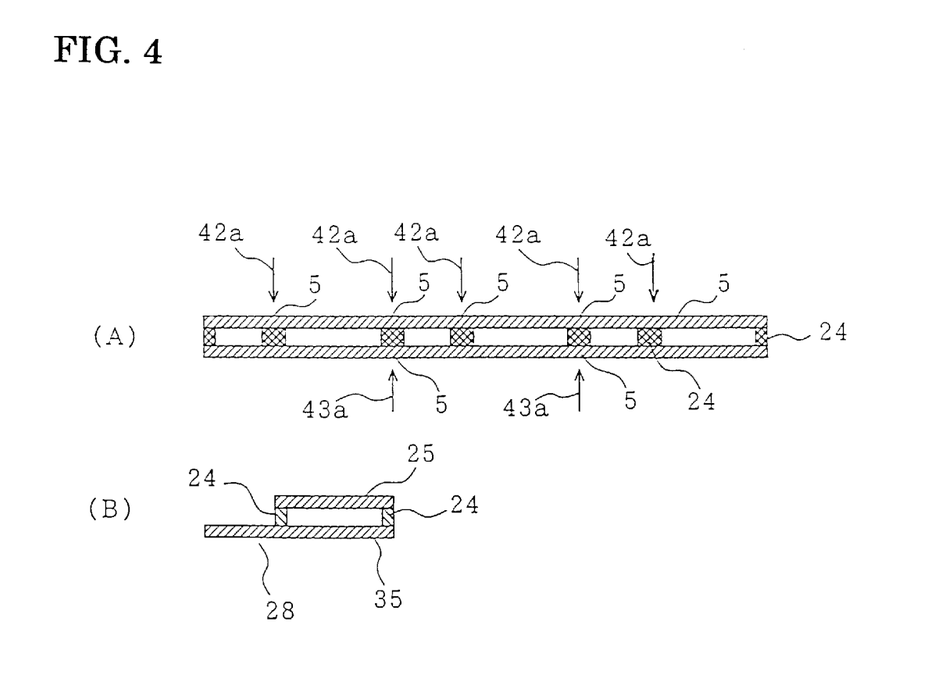
FIG. 4 is an explanatory view showing a state in which a panel is cut.

(G) Next, as a secondary break step, the strip-shaped panel 27 in which liquid crystal is sealed is cut to form a liquid crystal panel 28 having a size corresponding to one panel (product) (see FIG. 3). In this cutting operation as well, scribe lines 5 are formed at cutting locations on both surfaces of the panel 27, and laser beams are applied to the scribe lines 5 on both surfaces of the panel 27 to perform cutting. At this time, for example, as shown in FIG. 4(A), laser beams 42a, 43a are moved along the scribe lines 5 on both surfaces in the direction perpendicular to the paper surface and are applied to the scribe lines 5 to cut the upper and lower substrates and the upper substrate. Thereby, a liquid crystal panel 28 shown in FIG. 4(B) is obtained.

(H) Next, a mounting step is performed, as shown in FIGS. 1 and 2.

For the cutting operation employing a laser beam, the laser beam itself may be moved as described above, or alternatively, a table on which a panel consisting of a pair of substrates is placed may be moved to perform laser cutting. Also, the panel may be cut by moving both of the laser beam and the table relatively.

Second Embodiment

Figure 5:
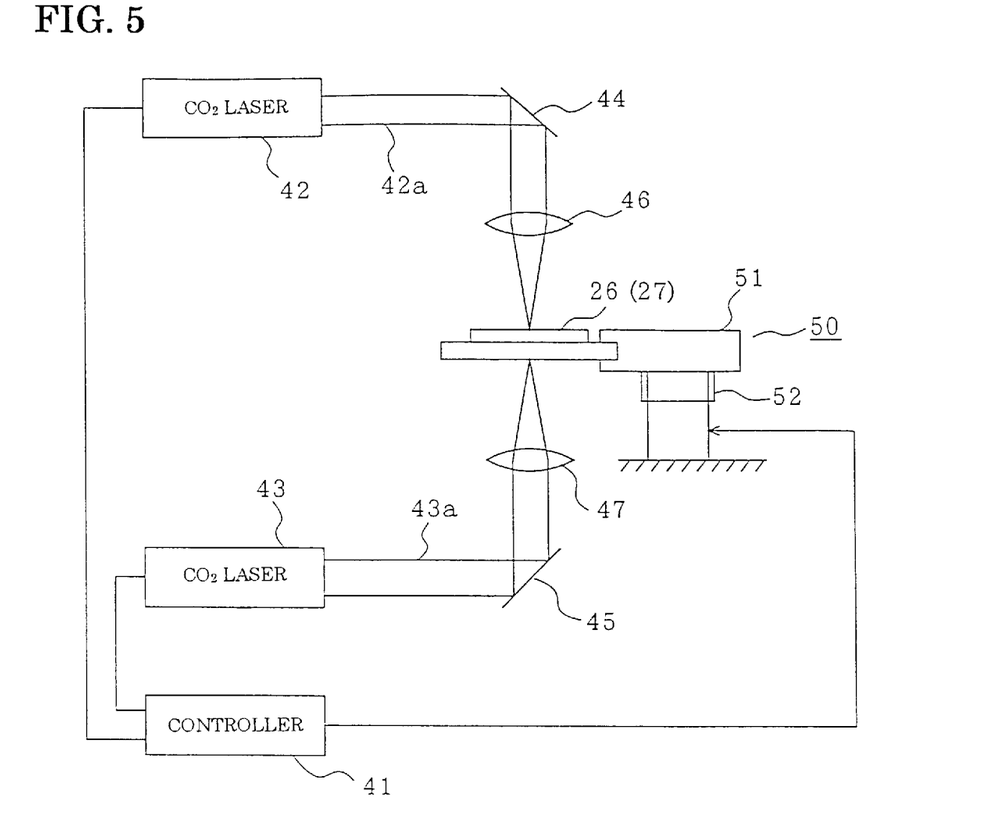
FIG. 5 is a schematic view of a laser cutting apparatus for carrying out a method in accordance with the first embodiment.

FIG. 5 is a schematic view of a laser cutting apparatus for carrying out a method in accordance with the first embodiment. This laser cutting apparatus has a controller 41. This controller 41 controls $CO_2$ lasers 42 and 43, by which $CO_2$ lasers 42 and 43 emit laser beams 42a and 43a, respectively. The laser beam 42a emitted from the $CO_2$ laser 42 is reflected by a total reflection mirror 44, and is applied onto the surface of the panel 26 (27) through a condenser lens 46. Likewise, the laser beam 43a emitted from the $CO_2$ laser 43 is reflected by a total reflection mirror 45, and is applied onto the back of the panel 26 (27) through a condenser lens 47. The total reflection mirrors 44 and 45 are supported so that the angle of reflection and the installation position thereof can be adjusted arbitrarily. The angle of incidence of the laser beam 42a, 43a with respect to the panel 26 (27) is set so that the laser beam 42a does not reach the $CO_2$ laser 43 and so that the laser beam 43a does not reach the $CO_2$ laser 42.

The panel 26 (27) to be cut is held by a work support section 48, and the position of the work support section 48 is controlled by a robot section 50 consisting of an X slide mechanism 51 and a Y slide mechanism 52.

Figure 6:
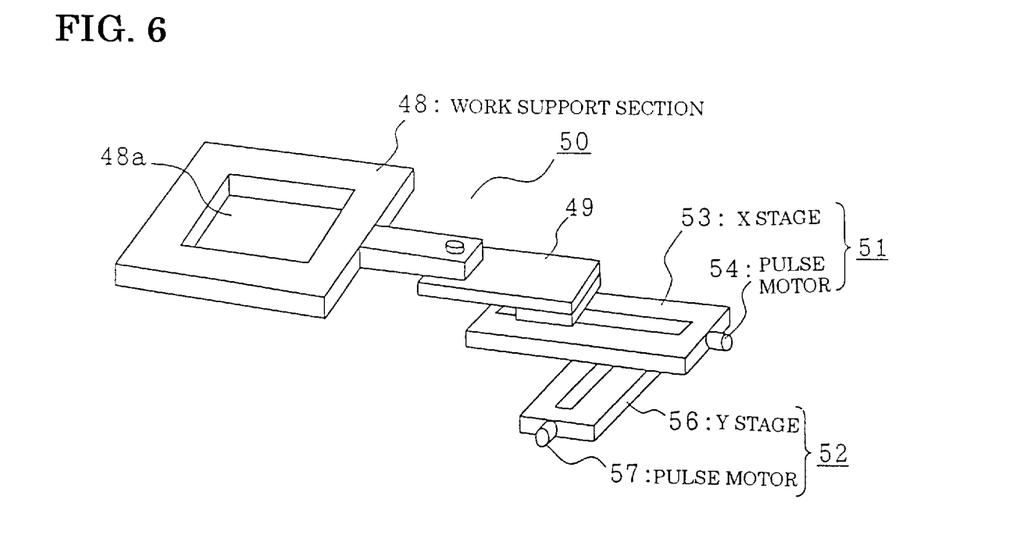
FIG. 6 is a mechanism view showing the details of a robot section for moving substrates to be cut.

FIG. 6 is a mechanism view showing the details of the robot section 50. The X slide mechanism 51 is mounted with an X stage 53, a pulse motor 54, and a shaft (not shown) driven by the pulse motor 54. The outside surface of the shaft is threaded so that the shaft is threadedly engaged with a member 49 connected to the work support section 48. Therefore, the work support section 48 is moved in the X direction by moving the member 49 by the rotation of the shaft. Also, the Y slide mechanism 52 is mounted with a Y stage 56, a pulse motor 57, and a shaft (not shown) driven by the pulse motor 57. The outside surface of the shaft is threaded so that the shaft is threadedly engaged with a member (not shown) provided on the backside of the X stage 53. Therefore, the X stage 53 is moved in the Y direction by moving the member by the rotation of the shaft, by which the work support section 48 is moved in the Y direction.

Next, the following is a description of the operation of a laser cutting apparatus having the configuration shown in FIGS. 5 and 6.

The panel (paired substrates) 26 (27) consisting of two opposed substrates on which the scribe lines 5 are formed at the cutting locations are fixed to the work support section 48. The $CO_2$ lasers 42 and 43 are controlled by the controller 41, and thus the $CO_2$ lasers 42 and 43 emit the laser beams 42a and 43a, respectively. The laserbeams 42a and 43a emitted from the $CO_2$ lasers 42 and 43 are reflected by the total reflection mirrors 44 and 45, pass through an opening (through hole) 48a formed in the work support section 48 after passing through the condenser lenses 46 and 47, and thereafter, 42 are applied to the front and back surfaces of the paired substrate 26 (27), respectively. Specifically, the laser beams are applied on the two substrates 26 (27) from both opposite sides.

In the above-described case, the robot section 50 moves the work support section 48 in the X or Y direction, by which the laser beams are moved along the scribe lines 5 to cut the substrates. Also, instead of moving the work support section 48 as described above, the laser beams may be moved by interposing a rotating mirror, a phase grating, etc. to cut the panel.

Figure 7:
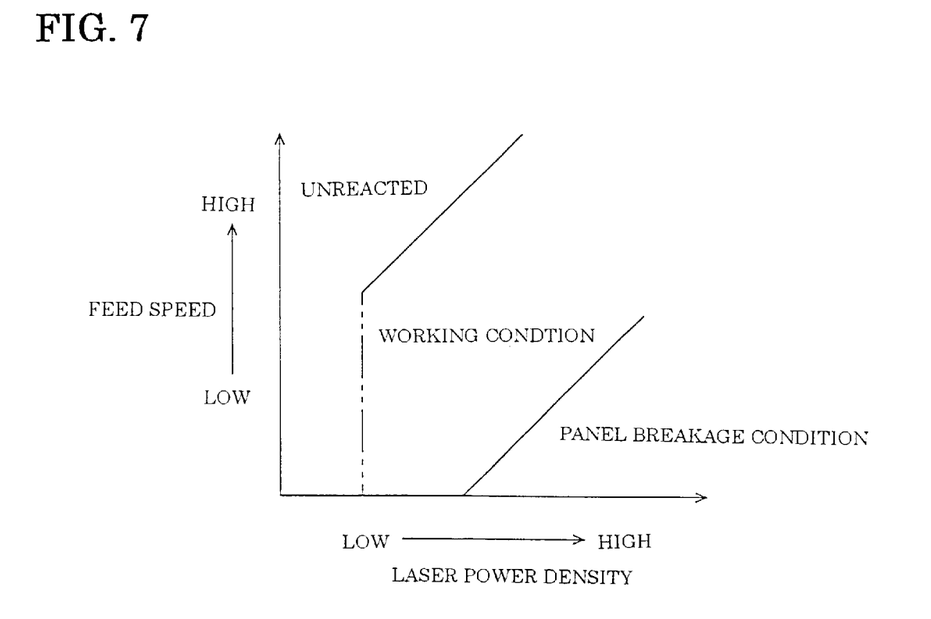
FIG. 7 is a characteristic diagram showing the working conditions for laser cutting.

FIG. 7 is a characteristic diagram showing the conditions for laser cutting. The power density and the feeding speed of a laser beam have a relationship shown in FIG. 7. For example, for soda glass with a thickness of 0.7 mm, it has been made sure that cutting can be performed under the following conditions. Incidentally, the feeding speed is limited due to the performance of the table of experimental equipment, and the power density is limited due to the capacity of laser, within the range shown below. Therefore, it is necessary to grasp the following numerical values from these viewpoints.

| Feeding speed | Power density |
|---|---|
| 10 mm/s | 0.5 to 1.5 W/mm$^2$ |
| 20 | 1.0 to 2.5 |
| 30 | 1.5 to 3.5 |
| 40 | 2.5 to 4.5 |
| 50 | 2.5 to 4.5 |

Figure 8:
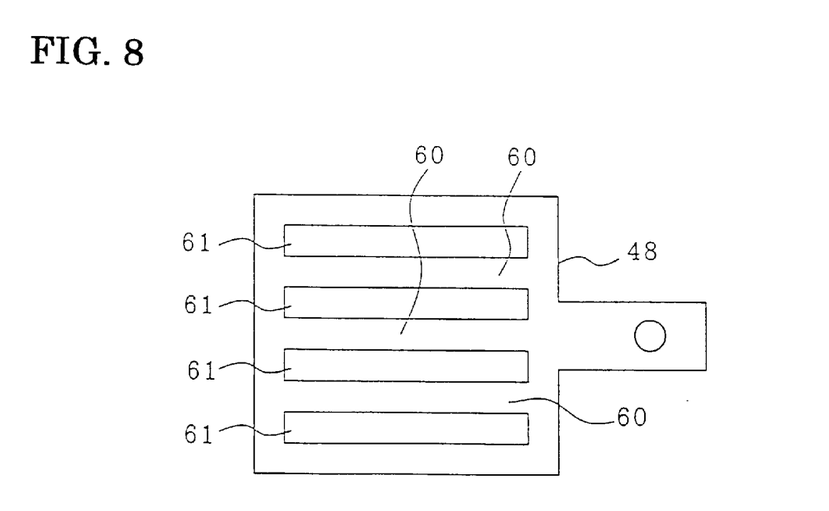
FIG. 8 is a plan view showing another example of a work support section.

FIG. 8 is a plan view showing another example of the work support section. In this example, a plurality of slender support sections 60 are formed in a portion corresponding to the opening 48a in the work support section 48 shown in FIG. 6, and the panel 26 (27) to be cut is supported by utilizing the support sections 60. A plurality of slender through holes 61 are formed between the support sections 60, and the laser beams 42a and 43a are applied onto the front and back surfaces of the panel 26 (27) through these through holes 61 to cut the panel 26 (27).

Third Embodiment

Figure 9:
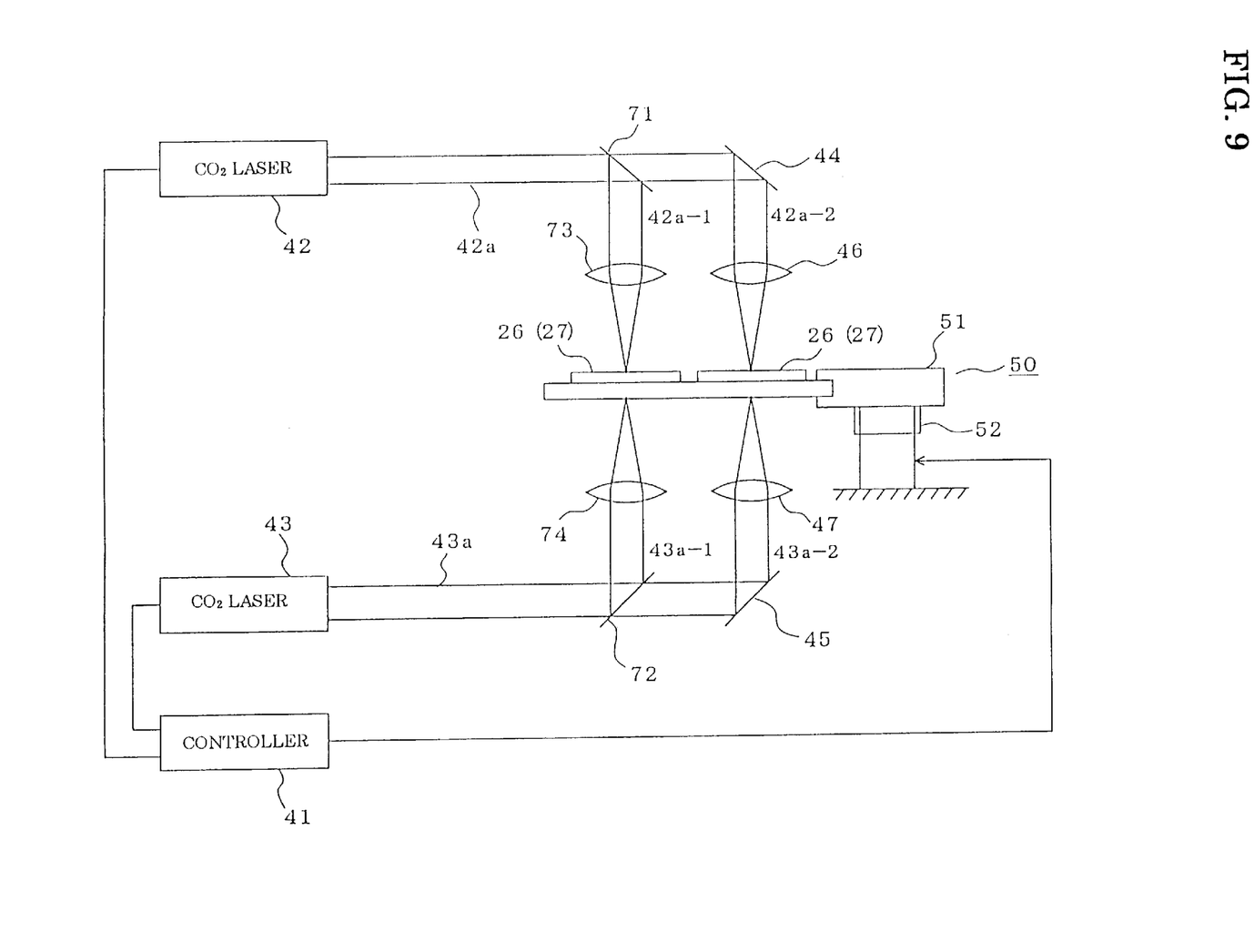
FIG. 9 is a schematic view showing another embodiment of the laser cutting apparatus in accordance with the present invention.

FIG. 9 is a schematic view showing another embodiment of a laser cutting apparatus in accordance with the present invention. In this embodiment, the laser beam 42a emitted from the $CO_2$ laser 42 is branched into two laser beams 42a-1 and 42a-2 through a dichroic mirror 71. The laser beams 42a-1 is applied to the panel 26 (27) through a condenser lens 73, and the laser beam 42a-2 is applied to the panel 26 (27) through the mirror 44 and the condenser lens 46 on the other hand, the laser beam 43a emitted from the $CO_2$ laser 43 is branched into two laser beams 43a-1 and 43a-2 through a dichroic mirror 72. The laser beams 43a-1 is applied to the panel 26 (27) through a condenser lens 74, and the laser beam 43a-2 is applied to the panel 26 (27) through the mirror 45 and the condenser lens 47. Incidentally, the laser beams 42a-1 and 42a-2 are applied to upper and lower opposed positions, and the laser beams 42a-2 and 43a-2 are applied to upper and lower opposed positions. A plurality of locations on the panel 26 (27) can be thereby cut at the same time, so that the working time can be saved.

Although a dichroic mirror is used to branch a laser beam into a plurality of beams in this embodiment, a polarization beam splitter or a diffraction grating can be used to branch a laser beam. Also, the number of laser beams obtained by branching a laser beam using such an element is not limited to two, and may be set appropriately.

Fourth Embodiment

Figure 10:
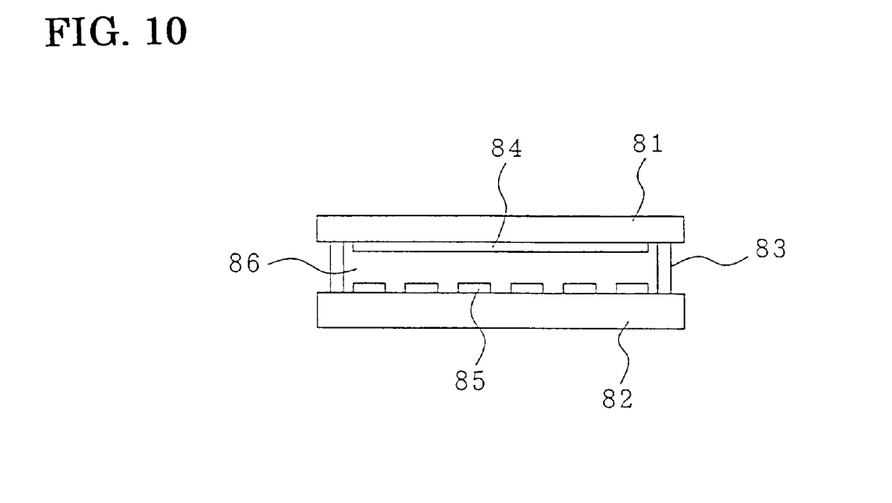
FIG. 10 is a sectional view showing a basic construction of a liquid crystal panel.

FIG. 10 shows a general construction of a liquid crystal panel manufactured by the laser cutting method and apparatus in accordance with the present invention. A liquid crystal panel generally has a construction such that transparent ITO electrodes 84 and 85 are disposed on the upper and lower glass substrates 81 and 82, respectively, and liquid crystal 86 is enclosed between these glass substrates 81 and 82 while being sealed by a sealing material 83. As a method of driving such a liquid crystal panel, a passive matrix drive and an active matrix drive are widely known. The method and apparatus in accordance with the present invention can manufacture a liquid crystal panel that is driven by either of these methods.

Figure 11:
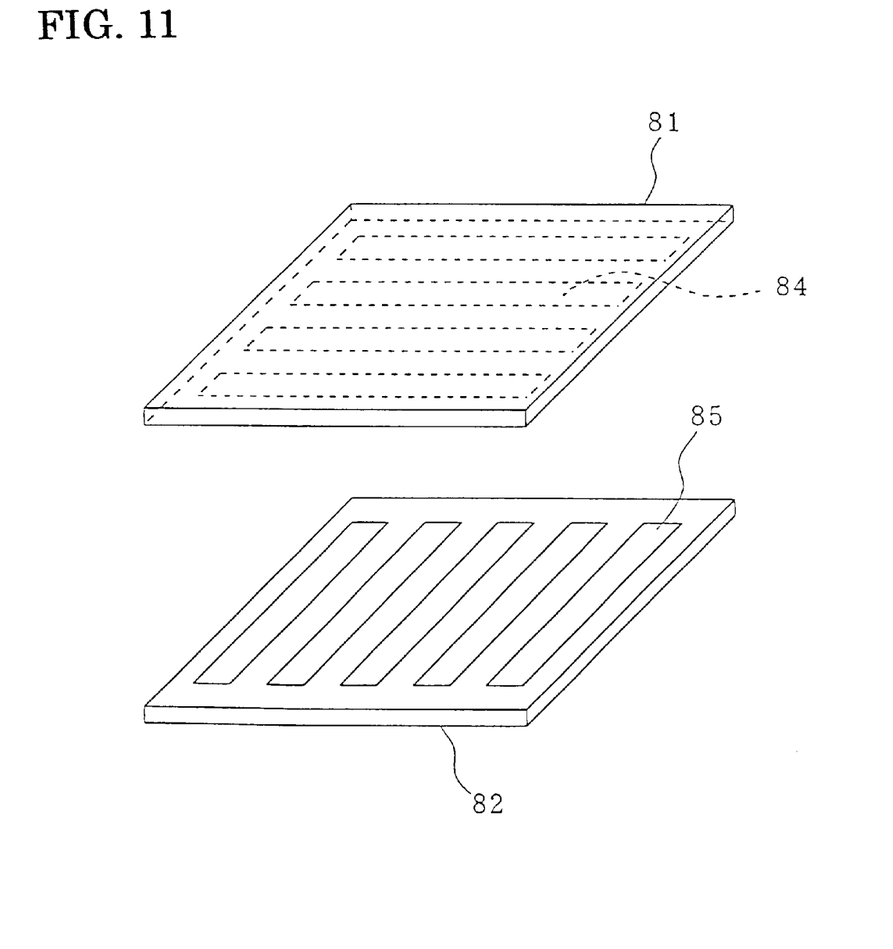
FIG. 11 is an explanatory view showing a basic construction of a liquid crystal panel driven by passive matrix drive.
Figure 12:
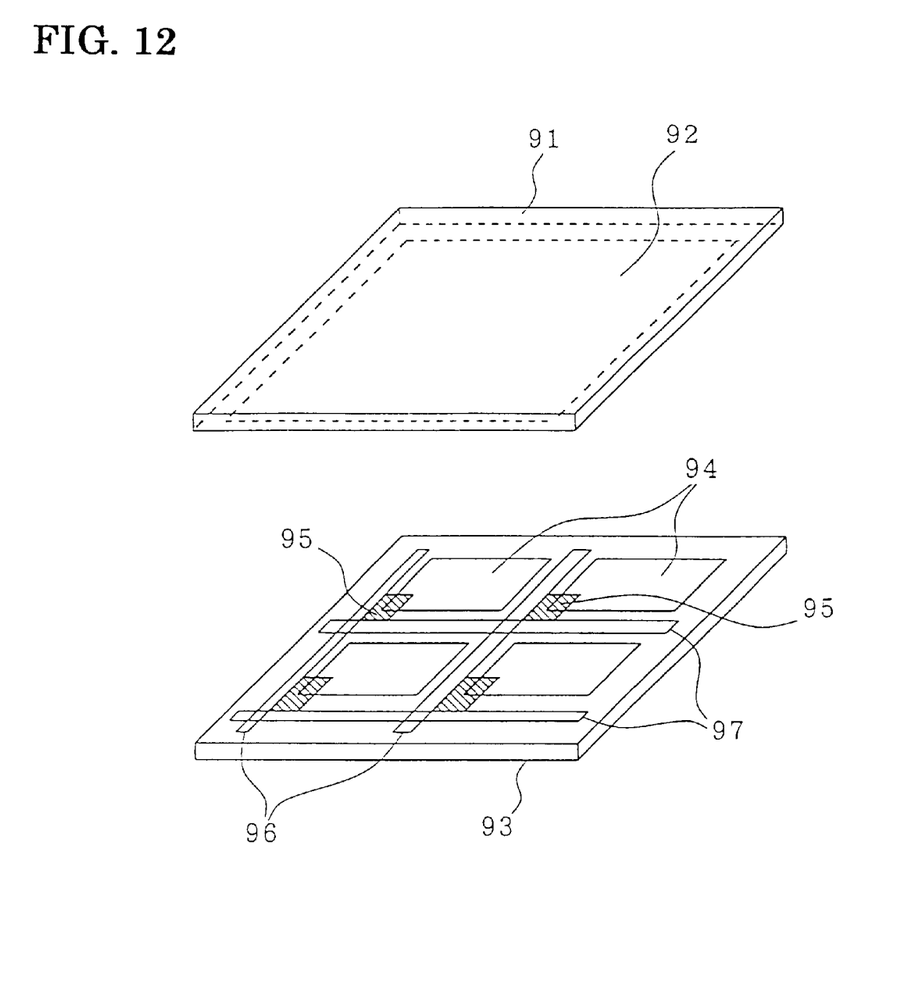
FIG. 12 is an explanatory view showing a basic construction of a liquid crystal panel driven by active matrix drive.

Next, the passive matrix drive and the active matrix drive will be explained briefly with reference to "Color TFT Liquid Crystal Display (compiled under the supervision of Teruhiko Yamazaki, Hideaki Kawakami, and Hiroo Hori, published by Kyoritsu Shuppan Co., Ltd., 1st edition published on Jul. 20, 1996)". The passive matrix drive is a method in which stripe-shaped scanning electrodes 84 and data electrodes 85 on the upper and lower glass substrates 81 and 82, respectively, are crossed as shown in FIG. 11, and respective electrodes are selected to apply a voltage to a picture element portion at an intersection of the electrodes. Contrarily, the active matrix drive is a method in which a common electrode 92 is disposed on an upper glass substrate 91, and a switching device 95 such as a thin-film transistor or a thin-film diode is arranged on each of picture element electrodes 94 disposed on a lower glass substrate 93 as shown in FIG. 12, so that a voltage is applied to each picture element by utilizing this switching device. In FIG. 12, reference numeral 96 denotes a gate line, and 97 denotes a source line.

Liquid crystal panels are of a transmission type or a reflection type. In the liquid crystal panel of the former type, transparent electrodes consisting of transparent ITO etc. are used as the upper and lower electrodes, and light is transmitted through the liquid crystal panel to effect light modulation. In the liquid crystal panel of the latter type, a light reflecting electrode such as aluminum is used as one of the upper and lower electrodes to reflect light, so that light modulation is effected. Further, a liquid crystal panel of a semi-transmission reflection type, which has properties of both transmission and reflection types, is also available, in which an opening for causing light emitted from a back light to pass through is provided in the reflection electrode of the reflection type liquid crystal panel. The laser cutting method and apparatus in accordance with the present invention can be used to cut a panel to obtain a liquid crystal panel having a necessary size in manufacturing any type of liquid crystal panel, that is, the transmission type, the reflection type, and the semi-transmission reflection type.

Fifth Embodiment

Although examples for cutting a liquid crystal panel have been explained in the above-described embodiments, an object to be cut in accordance with the present invention is not limited to a liquid crystal panel, and the present invention can be applied to the cutting of crystal, semiconductor (high-density mounted), quartz oscillator (especially, box portion), etc. A laser having a high energy absorption coefficient with respect to the substrate is used to cut a panel. For example, a $CO_2$ laser is used for cutting the substrate made of a glass-based or crystal-based member, and a YAG laser is used for cutting the substrate made of a silicon-based member.

Further, scribe lines are formed at the cutting locations and then laser beams are applied by way of example in the above-described embodiments. However, when high cutting accuracy is not required, the formation of scribe lines may be omitted so that the laser beams are directly applied to the cutting locations to cut a panel.

Further, the scanning of laser beam is effected as an example in the above-described embodiments, but the laser beam may be applied in a line form.

Further, two lasers, upper and lower, are used as an example in the above-described embodiments. However, such a configuration may be adopted that one laser is used to prepare a laser beam which is branched into two beams, upper and lower, by a dichroic mirror, polarization beam splitter, diffraction grating, etc. so that the branched laser beams are applied to both sides of the substrates.

Further, in a scanning mechanism of robot section, a robot (SCARA robot) may be used which has not only a mechanism for moving in the X and Y directions but also an arm movable, for example, in both of the radial and rotational directions.

Sixth Embodiment

Figure 13:
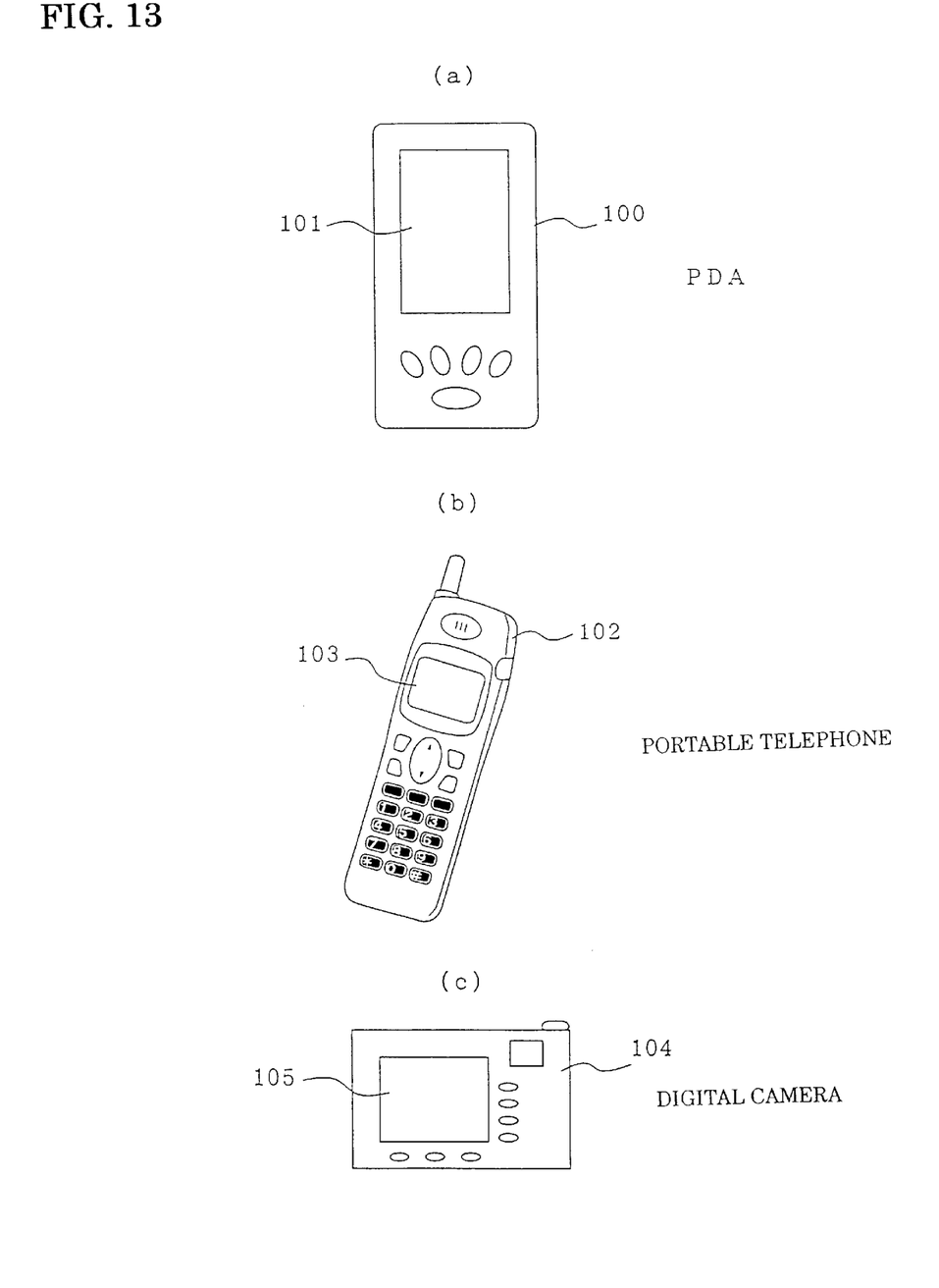
FIG. 13 is a view showing an example of a liquid crystal device using a liquid crystal panel manufactured by the method and apparatus in accordance with the present invention.

It is a matter of course that the above-described laser cutting method can be used as a manufacturing method for a liquid crystal device, and the above-described laser cutting apparatus can be used as a manufacturing apparatus for a liquid crystal device. The method and apparatus in accordance with the present invention can be used in manufacturing various types of mobile equipment with a liquid crystal device, in which a liquid crystal device is disposed in the display section, such as a PDA (Personal Digital Assistance) as shown in FIG. 13(*a*), a portable telephone as shown in FIG. 13(*b*), and a digital camera as shown in FIG. 13(*c*). In FIG. 13, a liquid crystal display section for a PDA 100 is denoted by 101, a liquid crystal display section for a portable telephone 102 is denoted by 103, and a liquid crystal display section for a digital camera 104 is denoted by 105.

According to the method and apparatus in accordance with the present invention, laser beams are applied to both surfaces of two bonded substrates to cut a pair of substrates or a panel consisting of a pair of substrates. Therefore, the substrates or the panel can be cut repeatedly with high cutting accuracy (linearity).

What is claimed is:

1. A laser cutting method in which a laser beam is applied to a pair of opposed substrates to cut said paired substrates, comprising at least the steps of:

applying a first laser beam from a first surface side of one substrate at a portion, in which a sealing material or a bonding layer is intervenient, of said paired substrates; and applying a second laser beam from a second surface side of the other substrate at said portion, in which a sealing material or a bonding layer is intervenient, of said paired substrates.

2. The laser cutting method according to claim 1, wherein said step of applying said first laser beam and said step of applying said second laser beam are carried out at the same time.

3. The laser cutting method according to claim 1, wherein scribe lines are formed in advance at cutting locations on said substrates, and said first and second laser beams are applied to said scribe lines.

4. The laser cutting method according to claim 1, wherein said paired substrates and said laser beams are moved to cut said paired substrates.

5. The laser cutting method according to claim 1, wherein said paired substrates are moved to cut said paired substrates.

6. The laser cutting method according to claim 5, wherein said paired substrates are moved at a speed based on correlation to a power density of said laser beams to cut said paired substrates.

7. The laser cutting method according to claim 1, wherein said laser beams are scanned to cut said paired substrates.

8. The laser cutting method according to claim 7, wherein said laser beams are moved at a speed based on correlation to a power density of said laser beams to cut said paired substrates.

9. The laser cutting method according to claim 1, wherein said substrates are made of a glass-based member or a crystal-based member.

10. The laser cutting method according to claim 1, wherein a laser having a high energy absorption coefficient with respect to said substrates is used to cut said substrates.

11. The laser cutting method according to claim 10, wherein a $CO_2$ laser is used to cut said substrates.

12. The laser cutting method according to claim 10, wherein a YAG laser is used to cut said substrates.

13. A method for manufacturing a liquid crystal device, comprising the steps of:

bonding a pair of opposed substrates to each other;

applying a first laser beam from a first surface side of one substrate at a portion, in which a sealing material is intervenient, of said paired substrates; and applying a second laser beam from a second surface side of the other substrate at said portion, in which a sealing material is intervenient, of said paired substrates.

14. The method for manufacturing a liquid crystal device according to claim 13, wherein said paired substrates are bonded to each other with intervention of a sealing material, and the paired substrates including said sealing material are cut.

15. The method for manufacturing a liquid crystal device according to claim 13, wherein each of said first and second laser beams is branched into a plurality of beams, and the branched beams are applied to a plurality of locations on each surface of said substrates to cut said substrates at the plurality of locations at the same time.

16. The method for manufacturing a liquid crystal device according to claim 13, wherein liquid crystal is injected between said paired substrates after said paired substrates are cut by said laser beams.

17. A method for manufacturing a liquid crystal device, comprising the steps of:

bonding a pair of opposed substrates to each other;

applying a first laser beam from a first surface side of one substrate of said paired substrates and applying a second laser beam from a second surface side of the other substrate of said paired substrates;

wherein after injecting liquid crystal between said paired substrates, said paired substrates are cut.

18. An apparatus for manufacturing a liquid crystal device constituted by a pair of opposed substrates and liquid crystal held between them, comprising:

a laser oscillator, a first irradiation mechanism for applying a first laser beam emitted from said laser oscillator from a first surface side of one substrate of said paired substrates, a second irradiation mechanism for applying a second laser beam emitted from said laser oscillator from a second surface side of the other substrate of said paired substrates, and a work support section for supporting said paired substrates, wherein said work support section has an opening portion through said work support section and said opening portion comprises a plurality of slender shaped openings.

* * * * *